(12) United States Patent
Tyson

(10) Patent No.: US 11,278,005 B1
(45) Date of Patent: Mar. 22, 2022

(54) NITE DOG APPAREL

(71) Applicant: Joshua Tyson, New York, NY (US)

(72) Inventor: Joshua Tyson, New York, NY (US)

( * ) Notice: Subject to any disclaimer, the term of this patent is extended or adjusted under 35 U.S.C. 154(b) by 0 days.

(21) Appl. No.: 17/300,344

(22) Filed: May 17, 2021

(51) Int. Cl.
| | |
|---|---|
| *A01K 13/00* | (2006.01) |
| *F21V 23/04* | (2006.01) |
| *F21V 33/00* | (2006.01) |
| *F21Y 115/10* | (2016.01) |

(52) U.S. Cl.
CPC ........ *A01K 13/006* (2013.01); *F21V 23/0435* (2013.01); *F21V 33/0008* (2013.01); *F21Y 2115/10* (2016.08)

(58) Field of Classification Search
CPC ...... A01K 13/006; A01K 13/00; A01K 13/07; F21V 23/0435; F21V 33/0008; F21V 23/04; F21V 33/00; F21Y 2115/10
See application file for complete search history.

(56) References Cited

U.S. PATENT DOCUMENTS

| | | | |
|---|---|---|---|
| 9,936,677 B1* | 4/2018 | Slater | A01K 13/007 |
| 2015/0313182 A1* | 11/2015 | Overman | F21L 4/02 |
| | | | 119/850 |
| 2016/0262462 A1* | 9/2016 | Kawamura | G09G 3/035 |
| 2017/0196201 A1* | 7/2017 | Kenney | A01K 27/005 |
| 2019/0060136 A1* | 2/2019 | Turner | A01K 29/005 |
| 2019/0364877 A1* | 12/2019 | Quintana | A01K 13/006 |

\* cited by examiner

*Primary Examiner* — Bao Q Truong

(57) ABSTRACT

Nite dog apparel is a product of the pet apparel industry. It is included in the dog apparel category. In this application nite dog apparel is comprised of a dog's garment with led string lights attached to garment. When the led string lights are activated, the dog's garment illuminates with light, providing visibility of pet at a distance when unleashed. The led string light mechanism can be activated manually or by a remote controlled device. Nite dog apparel illuminates a dim or dark dog path when walking pets and enhances pet visibility at night.

3 Claims, 1 Drawing Sheet

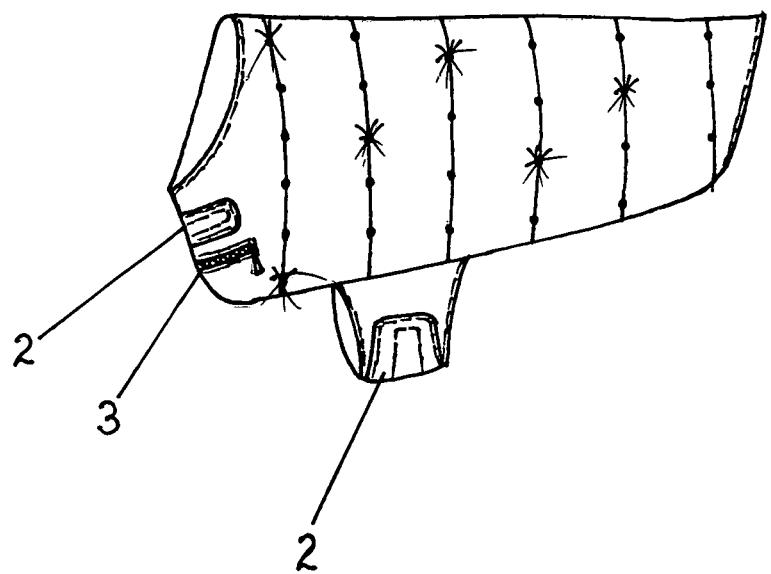

NITE DOG APPAREL

Nite dog apparel is comprised of dog apparel with led string lights attached to the garment. The top layer of fabric of the dog's jacket is made of transparent or translucent material that overlays the led string lights. These lights provide transparency for lighting visibility. The led string lights are arranged in various designs and shapes that are sewn on top of the second layer of fabric. The raincoat version of nite dog apparel is waterproof and protects pets in rain or snow. The led string lights can be activated by remote control or activated manually by a switch concealed in a zip compartment in the garment. When activated the led string lights illuminate the dog's garment providing visibility for night walks with pets. Nite dog apparel is novel, fun and adds another dimension to dog apparel and dog walking at night.

BACKGROUND

Nite dog apparel evolved from the pet clothing and accessory industry. Nite dog apparel consist primarily of dog jackets, sweaters and accessories that have led string lights attached to the garment. The led string lights are arranged in various designs and shapes on the garments. Nite dog apparel enhances dog walking at night by illuminating dog apparel and providing the pets visibility at a distance when unleashed. The led string lights are attached to an activation switch concealed inside a zip compartment in the garment. The application of led lights on a dog's garment is an improvement in art.

SUMMARY

Nite dog apparel is dog apparel that illuminate with lights. Nite dog apparel is comprised of led string lights attached to dogs apparel in a multitude of shapes and designs. Nite dog apparel improves current art by illuminating dogs apparel with lighting and visibility for pet walking at night. For off the leash dog walking, pets are visible at a distance and in bushy areas with nite dog apparel. Nite dog apparel can be worn by dogs day or night with the option of illumination at night. Nite dog apparel can be made of waterproof fabrics permitting pet owners to walk dogs in snow or rain.

BRIEF DESCRIPTION OF DRAWINGS

FIG. 1 Drawing shows three dimensional side view of nite dog apparel with led string lights 1, Velcro tabs 2, and zip compartment 3, for activation switch.

What is claimed is:

1. A garment for a dog, comprising:
at least two layers, at least one of which is translucent, the layers forming left and right sides of the garment;
a front end and rear end, both ends having openings for the dog's head and body, respectively;
LED lights positioned between the two layers, wherein the translucent layer is the outermost layer and covers the LED lights;
a zippered compartment positioned on the front end of the garment, below the opening on the front end, and traversing the garment from the left side to the right side, and having an activation switch disposed inside the zippered compartment;
a first Velcro tab positioned on the front end of the garment; and
a second Velcro tab attached to a bottom side of the garment and forming a loop.

2. A garment for a dog, comprising:
at least two layers forming left and right sides, at least one of which is translucent;
a front end and rear end, both ends having openings for the dog's head and body, respectively;
string LED lights positioned between the two layers, and oriented in a vertical direction on the garment, in parallel columns, wherein the translucent layer is the outermost layer covering the LED lights;
a zippered compartment positioned on the front end of the garment, below the opening on the front end, and traversing the garment from a left side to a right side, and having an activation switch disposed inside the zippered compartment.

3. A garment for a dog, comprising:
at least two layers, at least one of which is translucent, the layers forming left and right sides of the garment;
a front end and rear end, both ends having openings for the dog's head and body, respectively;
string LED lights positioned between the two layers, oriented in parallel columns, wherein the translucent layer is the outermost layer and covers the LED lights;
a zippered compartment positioned on the front end of the garment, below the opening on the front end, and traversing the garment from the left side to the right side, and having an activation switch disposed inside the zippered compartment;
a first Velcro tab positioned on the front end of the garment; and
a second Velcro tab attached to a bottom side of the garment and forming a loop.

* * * * *